Sept. 2, 1969     A. P. BROUWERS ET AL     3,464,233
LEAF SPRING COUPLING
Filed Dec. 6, 1967     2 Sheets-Sheet 1
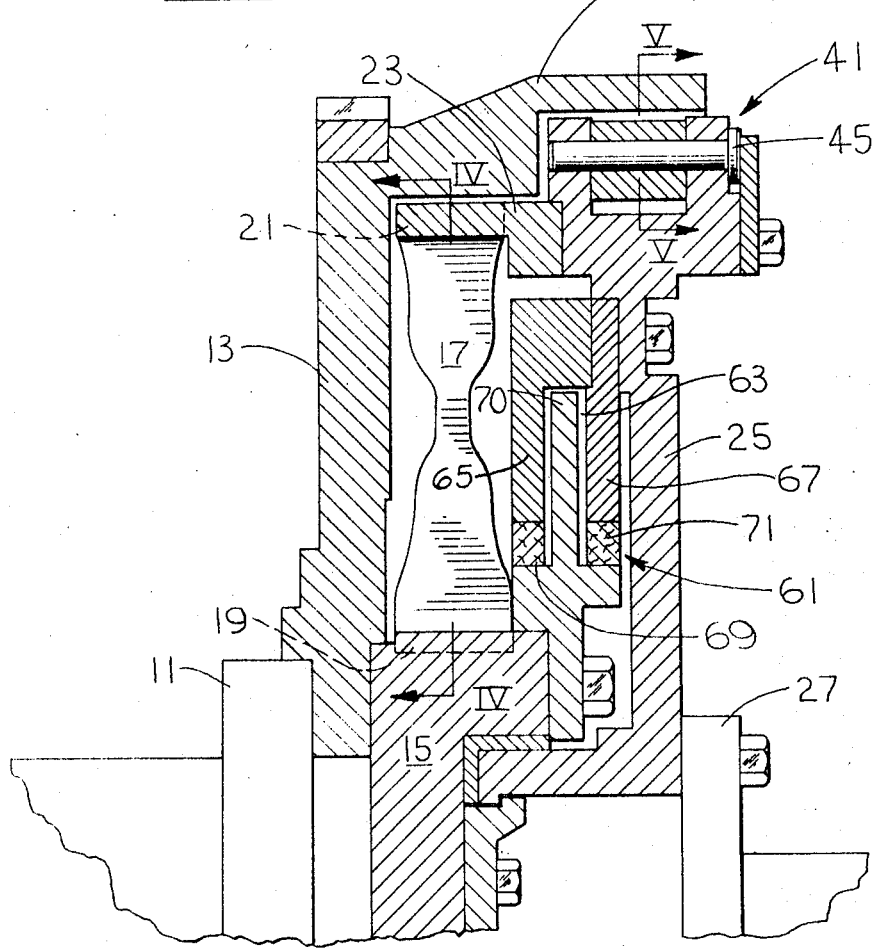
INVENTORS
ALEXANDER P. BROUWERS
WALTER J. MCCULLA
MORRIS A. SWANSON

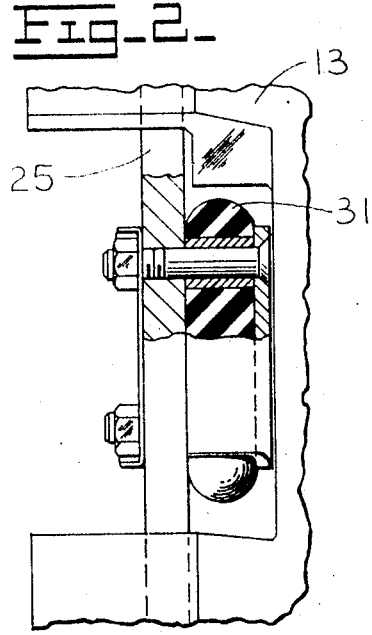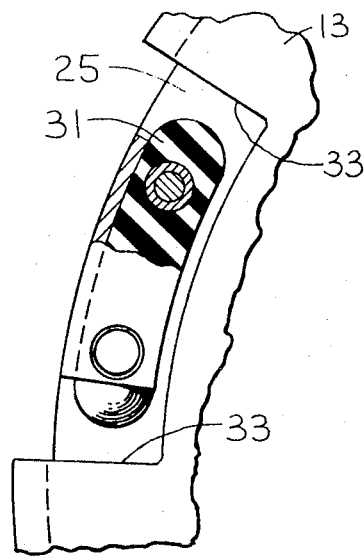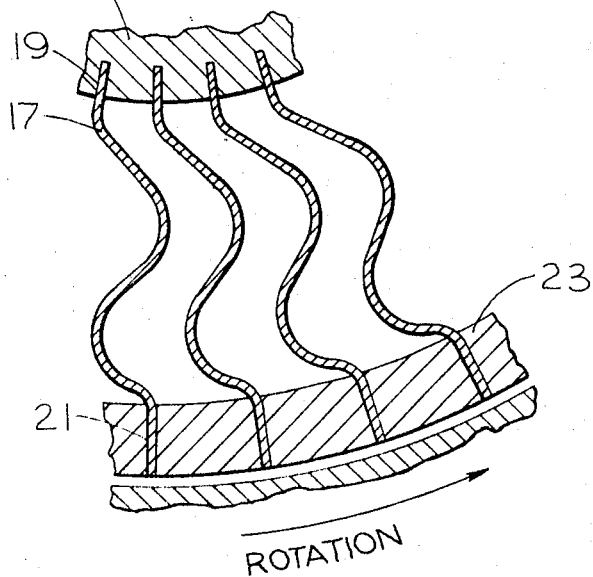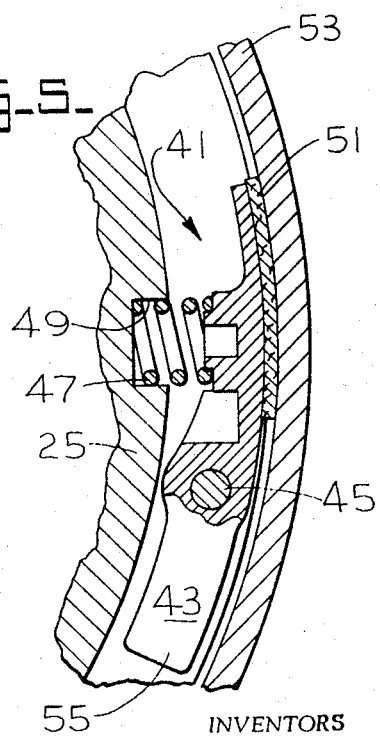

United States Patent Office 3,464,233
Patented Sept. 2, 1969

3,464,233
LEAF SPRING COUPLING
Alexander P. Brouwers, La Grange Park, and Walter J. McCulla and Morris A. Swanson, Washington, Ill., assignors to Caterpillar Tractor Co., Peoria, Ill., a corporation of California
Filed Dec. 6, 1967, Ser. No. 688,385
Int. Cl. F16d 3/14
U.S. Cl. 64—27        6 Claims

ABSTRACT OF THE DISCLOSURE

A leaf spring coupling for reducing the torsional vibration transmitted from an internal combustion engine to a driven member. The coupling may be fitted with damper means of coulomb, viscous, and/or rubber stop types. These dampers serve to absorb torque surges and torsional vibration beyond the capacity of the leaf springs.

---

Control of torsional vibrations in internal combustion engines becomes increasingly difficult when turbocharging is used to increase the output. Light weight engines, having small rotating inertia, and those with a small number of cylinders have relatively large forced vibration amplitudes at the flywheel. The practicalities of weight and space requirements, as opposed to engine speed response, rule out the possibility of using large inertia flywheels to limit these torsional amplitudes. The torsional vibrations induced in the driven machinery produce high wear rates, parts failures, and undesirable noise.

It is therefore an object of this invention to provide a soft coupling which will deliver engine power smoothly, regardless of application.

It is also an object of the instant invention to provide a leaf spring coupling having linear torque-deflection characteristics, which will isolate the fluctuating torque and motion of the engine from the driven members.

It is also an object of the invention to provide a low spring rate coupling with high torque capacity having a reasonable number of springs.

It is a further object of the invention to disclose a leaf spring coupling which is relatively insensitive to the effects of large centrifugal accelerations encountered during engine overspeed.

It is also an object of the invention to provide a leaf spring coupling utilizing elastic stops to protect the springs from torque overloads and to give quiet operation during sudden clutch engagements.

It is also an object of the invention to provide a leaf spring coupling wherein mecahnical dampers are utilized to allow the coupling to pass through or operate at the first mode resonant speed without destroying the elastic stops.

It is a further object of the invention to provide such a coupling wherein the mechanical dampers permit operation at the high modes of resonance.

It is a still further object of the invention to provide a leaf spring coupling wherein some damping may be utilized to limit transient vibrations caused by variations in the transmitted torque.

It is also an object of the instant invention to provide a leaf spring coupling wherein the coupling is not susceptible to deterioration due to environmental conditions.

It is also an object of the instant invention to provide a leaf spring coupling wherein the springs have uniform stress rates throughout the spring in either direction of coupling deflection.

It is an object of this invention to provide a leaf spring coupling wherein the springs are of a uniform thickness so as to maintain a uniform spring rate and bending stress throughout the spring length.

It is also an object of the invention to provide such a coupling wherein the spring thickness is uniform while the spring shape and profile are varied, thereby maintaining a constant instability characteristic and resonant frequency for all values of steady torgue.

It is a further object of the instant invention to provide a leaf spring coupling wherein the spring is fixed at each end, thereby obviating the probability of wear or breaking.

Further objects of this invention will be apparent to those skilled in the art from the following detailed description of a preferred embodiment thereof with reference to the accompanying drawings.

In the drawings:

FIG. 1 shows a sectioned side view of the upper half of the leaf spring coupling;

FIG. 2 shows a side view of an elastic stop member utilized in the coupling;

FIG. 3 shows an end view of the elastic stop member shown in FIG. 2;

FIG. 4 shows a partial view of the series of springs of the coupling taken along a line IV—IV of FIG. 1;

FIG. 5 shows a view of the coulomb coupling taken along a line V—V of FIG. 1.

Referring to the drawings in more detail, a crankshaft 11 rotates an engine flywheel 13 and a coupling input hub 15. Torque is transmitted from flywheel 13 and hub 15 through a series of evenly spaced S-shaped springs 17 which are bonded into slots 19 in hub 15 and 21 in retainer ring 23 on the output side of the coupling. The springs may be bonded in any suitable manner, such as by means of epoxy cement.

Retainer ring 23 is fastened to an output housing 25 which, in turn, is suitably attached to an output shaft 27.

So as to maintain a constant resonant frequency for all values of steady torque as well as a uniform bending stress and spring rate throughout the spring at any specific angle of deflection, the springs are of uniform thickness over their lengths but are S-shaped as shown in FIG. 4 with a variable profile as shown in FIG. 1.

As shown in FIG. 4, the end of the spring at rim 23 is offset with respect to hub 15 in the direction of rotation. When the angle of offset is approximately 8°, the spring is found to have equal end stresses in the negative direction, uniform stress in the positive direction, and the spring rate varies only a minimum amount with deflection. Since the provision of equal stress throughout the spring length allows greater spring deflection, the width of springs 17 must be greater at hub 15 than at ring 23 due to the smaller diameter.

To protect the leaf springs from overload, elastic stops are necessary to limit the coupling deflection. As shown in FIGS. 2 and 3, rubber stops 31, evenly spaced on the flywheel and suitably attached thereto, limit the relative movement between the input hub and the retainer ring by abutting against surfaces 33 on the flywheel 13. The rubber stops are carried in fabricated covers 35 mounted on housing 25 and act in either direction against the surfaces 33 in the flywheel.

Since torque surges through a coupling are more severe at low r.p.m.'s, a damping device must be provided to absorb the torque which the leaf springs are unable to absorb. Although this disclosed embodiment provides for a plurality of types of dampers in the coupling, it is obvious that, if desired, only one type need be used.

A coulomb damper 41 mounted in the coupling provides for constant damping rather than damping that is proportional to coupling velocity. A plurality of such dampers may be evenly spaced about the housing 25. As shown in FIG. 5, a shoe assembly 43 pivots about a pin 45 mounted in housing 25 such that, as the coupling rotates at low speeds, a spring 47 seated in an aperture 49 in the housing biases the friction side 51 of the shoe against the inside face of the flywheel drum 53. The relative rotation between the flywheel and output housing is thus reduced or damped during torque surges so that springs 17 are not subject to the full load.

As the input shaft drives the output shaft to a speed above a predetermined speed, centrifugal force commences to act upon the counterweight portion 55 of shoe assembly 43, thereby pivoting the braking portion 51 out of contact with drum 53. Thus, above a predetermined speed, the coulomb damper does not provide any damping force to the coupling and the relatively lower magnitude torque surges at the higher r.p.m.'s are not absorbed by the coulomb damper.

As shown in FIG. 1, a viscous damper 61 may also be installed in the coupling. A ring-shaped chamber 63 is formed between plates 65 and 67 which are suitably fixed to the output housing 25. A disc 69 of smaller thickness than chamber 63 is inserted between plates 65 and 67 and is fixed to the input hub 15 in such a way that seals 69 and 71 prevent leakage from chamber 63.

A silicone fluid is then injected into the chamber so that as torque surges rotate the coupling input relative to the coupling output, the silicone fluid must be sheared—thereby providing a damping effect. It should be noted that the effect of the viscous damper will vary with rotational speeds since the viscosity varies with the mode of the vibrational frequency.

Thus the applicants have provided a new and improved soft coupling device for smoothing out the torque surges transmitted from an engine to driven machinery, the scope of protection of such coupling being limited only by the following claims.

We claim:
1. In a coupling system, an input means and an output means, a spring system interconnecting said input and output means, and a damper means in said coupling, wherein said spring system comprises a series of equally spaced leaf springs extending in substantially radial directions about the axis of said coupling, each of said leaf springs is S-shaped and is fixed to said input means and to said output means, and the output end of each spring is advanced in the direction of rotation relative to the input end thereof.

2. The coupling of claim 1 wherein each of said springs are uniform in thickness and nonuniform in profile throughout the length thereof.

3. The coupling of claim 1 wherein said damper means comprises a plurality of plates connected to said output means and forming a chamber between said plates, a plate connected to said input means and extending into said chamber, and a silicone fluid in said chamber whereby said fluid is sheared by said plate connected to said input as it rotates relative to said plates attached to said output.

4. The coupling of claim 1 wherein said damper means comprises a shoe pivotally mounted on said output means, a biasing means pivotally urges a friction surface on said shoe against said input means, and a counterweight means pivotally urges said friction surface away from said input means by means of centrifugal force.

5. The device of claim 1 including an elastic member mounted on said output means and surface means on said input means whereby relative rotation between said input and output means beyond a predetermined degree of relative movement will cause said elastic member to abut one of said surface means, thereby stopping said relative rotation.

6. A coupling system comprising an input and an output means, a spring system including a series of equally spaced leaf springs extending in substantially radial directions about the axis of the coupling and fixed between the input and the output means, and a damper means in the coupling including a shoe pivotally mounted on one of the input and output means, a friction surface on the shoe, a biasing means pivotally urging the friction surface on the shoe toward the other of the input and output means, and a centrifugal force actuated means pivotally urging the friction surface on the shoe away from the other of the input and output means.

References Cited

UNITED STATES PATENTS

| | | | |
|---|---|---|---|
| 2,158,847 | 5/1939 | Baumann | 64—15 |
| 2,863,542 | 12/1958 | Kelsey | 64—26 X |
| 3,023,593 | 3/1962 | Nallinger | 64—27 |

FOREIGN PATENTS

| | | |
|---|---|---|
| 16,584 | 7/1912 | Great Britain. |
| 350,943 | 6/1931 | Great Britain. |
| 459,909 | 1/1937 | Great Britain. |
| 508,425 | 6/1939 | Great Britain. |

HALL C. COE, Primary Examiner

U.S. Cl. X.R.

64—30